United States Patent
Gu et al.

(10) Patent No.: US 9,452,847 B2
(45) Date of Patent: Sep. 27, 2016

(54) SYSTEM AND METHOD FOR DETECTING ADDITION OF ENGINE LUBRICANT

(71) Applicant: AIR CHINA LIMITED, Beijing (CN)

(72) Inventors: Zhuping Gu, Beijing (CN); Huifeng Ding, Beijing (CN); Jiaju Wu, Beijing (CN); Fengliang Zheng, Beijing (CN); Lei Huang, Beijing (CN); Bingzheng Wang, Beijing (CN); Hongtao Ma, Beijing (CN); Lei Chen, Beijing (CN); Rong Wang, Beijing (CN)

(73) Assignee: Air China Limited, Beijing (CN)

( * ) Notice: Subject to any disclaimer, the term of this patent is extended or adjusted under 35 U.S.C. 154(b) by 23 days.

(21) Appl. No.: 14/339,343

(22) Filed: Jul. 23, 2014

(65) Prior Publication Data

US 2015/0073648 A1  Mar. 12, 2015

(30) Foreign Application Priority Data

Jul. 24, 2013 (CN) .......................... 2013 1 0314246

(51) Int. Cl.
| | |
|---|---|
| *B64D 45/00* | (2006.01) |
| *F01D 25/18* | (2006.01) |
| *F01M 11/12* | (2006.01) |
| *F01D 17/02* | (2006.01) |
| *F01D 17/20* | (2006.01) |
| *F01M 11/10* | (2006.01) |

(52) U.S. Cl.
CPC ............... *B64D 45/00* (2013.01); *F01D 17/02* (2013.01); *F01D 17/20* (2013.01); *F01D 25/18* (2013.01); *F01M 11/12* (2013.01); *B64D 2045/0085* (2013.01); *F01M 2011/1453* (2013.01); *F01M 2250/60* (2013.01)

(58) Field of Classification Search
CPC .......... B64D 45/00; B64D 2045/0085; F01D 17/20; F01D 17/02; F01D 25/18; F01M 11/12; F01M 2250/60; F01M 2011/1453
See application file for complete search history.

(56) References Cited

U.S. PATENT DOCUMENTS

| | | | |
|---|---|---|---|
| 2005/0034924 A1* | 2/2005 | James | F01D 21/14 184/6.4 |
| 2005/0118900 A1* | 6/2005 | Takahashi | F01M 11/061 440/88 L |
| 2009/0076677 A1 | 3/2009 | Walthall et al. | |
| 2011/0010069 A1 | 1/2011 | Payne et al. | |

FOREIGN PATENT DOCUMENTS

| | | |
|---|---|---|
| DE | 10061041 A1 | 6/2002 |
| EP | 2072762 A1 | 6/2009 |
| FR | 2958911 A1 | 10/2011 |

OTHER PUBLICATIONS

European Search report for Application No. 14178432.2 dated Nov. 28, 2014, 6 pages.

* cited by examiner

*Primary Examiner* — Rodney Butler
(74) *Attorney, Agent, or Firm* — Husch Blackwell LLP

(57) ABSTRACT

The present invention relates to a method for detecting addition of engine lubricant, comprising: determining whether the difference value between the lubricant quantity at a first timing and that at a second timing is greater than a first threshold value; delaying a period and determining whether the difference value between the lubricant quantity at a third timing and that at a fourth timing is greater than a second threshold value in response to that the difference value between the lubricant quantity at the first timing and that at the second timing is greater than the first threshold value; and detecting the lubricant increment in response to that the difference value between the lubricant quantity at the third timing and that at the fourth timing is greater than the second threshold value.

36 Claims, 8 Drawing Sheets

ENG OIL ADDING DET RPT<027>

|    | A/C ID<br>Plane No. | FROM<br>UTC Time | TO<br>Flying | FLT<br>Ground | DATE UTC<br>Flight No. |  |  |
|----|---------------------|------------------|--------------|---------------|------------------------|---|---|
| CC | aaaa                | aaaa             | aaaa         | aaaa          | aaaa                   |  |  |
|    | PH<br>Segment       | CNT<br>Count     | CODE<br>Trigger Code | APU<br>State of Bleed Air Valve | BLEED STATUS<br>Bleed Air Valve of APU |  |  |
| C1 | 01                  | 0                | 1000         | 1             | 50x0001000x52          |  |  |
|    | TAT<br>Total Temperature | ALT<br>Datum Mark | CAS<br>Computed Airspeed | MN<br>Mach Speed | GW<br>Total Weight | CG<br>Gravity Center | DMU<br>DMU Version |
| CE | 024.5               | 03771            |              |               | 0                      |  | I21CA2 |

PARAMETERS PRESET

|    | 27TMR<br>End Time of message | CKTMR<br>Checking Time for changing of the lubricant amount | ENDTMR<br>The stop time of the checking for lubricant increment | DETQ<br>Threshold Value of the lubricant increment | ENDTQ<br>Threshold Value of the lubricant increment at the end of checking | OIQEXT<br>The maximum time interval in acquistion |
|----|---|---|---|---|---|---|
| PP | 2400 | 20 | 30 | 0.5 | 0 | 10 |

POST ENGINE SHUT DOWN FOR 10MINs

|    | OIQ_ENG1<br>The lubricant amount after the stop of the left engine | OIQ_ENG2<br>The lubricant amount after the stop of the right engine | ENG_SHUTTIME<br>The stop time of engine |
|----|---|---|---|
| Z4 | 22.75 | 23 | aaaa |

POST ENGINE SHUT DOWN FOR 45MINs OR 5s PER NEXT MEs

|    |       |       |      |
|----|-------|-------|------|
| Z5 | 21.75 | 22.25 | aaaa |

ENGINE OIL ADDING EVENT DETECTION 3MINS INTERVAL WITHIN 10MINS

|    | OIL ADD<br>Add oil or not | TIME<br>Add Time | PFAD<br>The mark of power-off add of oil | -20S<br>The lubricant amount in the first 20 seconds | OIQST<br>The lubricant amount when adding oil | OIQOLD<br>Nonvolatile memory data of lubricant amount |
|----|---|---|---|---|---|---|
| AL | 0 | 0 | 0 | 0 | 0 | 21.75 |
| AR | 0 | 0 | 0 | 0 | 0 | 22.25 |
|    | QDT0 | QDT1 | QDT2 | QDT3 | QDT4 |  |
| ML | 0 | 0 | 0 | 0 | 0 |  |
| DL | 0 | 0 | 0 | 0 | 0 |  |
|    | QDT0 | QDT1 | QDT2 | QDT3 | QDT4 |  |
| NR | z•zz | z•zz | z•zz | z•zz | z•zz |  |
| DR | -zzzS | zzzzzz | zzzzzz | zzzzzz | zzzzzz |  |

RATE SINCE LAST OIL ADDING(Qt/Hr)

|    | CAL(G+A)<br>Lubricant Consumption (Sky+Ground) | CAL(AIR)<br>Lubricant Consumption (Sky) | OIQAV<br>The average of the added amount of lubricant | OIQDT<br>The total amount of the lubricant in detection | OIQCNT<br>The number of detection of lubricant |
|----|---|---|---|---|---|
| CL | z•zz | z•zz | zz•zz | zz•zz | z |
| CR | z•zz | z•zz | zz•zz | zz•zz | z |

OIL ADDING MANUAL RECORD

|    | QT<br>Manual input lubricant amount | FH<br>Manual input flying hours of the interval between adding lubricant | OIL CAL<br>Manual input computed lubricant consumption | EMPLOY ID<br>Staff ID |
|----|---|---|---|---|
| EL | z•z | zzz•zz | z•zz | zzzzzz |
| ER | z•z | zzz•zz | z•zz |  |

SYSTEM AND METHOD FOR DETECTING ADDITION OF ENGINE LUBRICANT

TECHNICAL FIELD

The present invention relates to a detection system and a detection method, in particular, to a system and a method for detecting addition of engine lubricant.

BACKGROUND ART

Lubricant system is an important component for maintaining normal operation of the engine. Lubricant keeps circulating within the engine so as to provide lubrication and heat dissipation for moving parts of the engine. When an abnormality occurs to some important components of the engine, such as the bearing, the lubricant heat exchanger, sealing of oil and gas and so forth, consumption of lubricant will change abnormally. Therefore, change in the consumption of lubricant is one of the important indicators reflecting performance of the engine. Deterioration of performance of the sub-parts within the engine can be spotted in a timely manner through continuously monitoring short-term and long-term changes in lubricant consumption and parameters of the lubricant system, and flameout of the engine in flight caused by direct or indirect failure of the lubricant system can be avoided. All airline companies attach great importance to the monitoring of lubricant quantity within the lubricant system of the engine. To know operation condition of the engine through calculating consumption rate of lubricant may guarantee flight safety of an aircraft.

Currently, addition of the lubricant and the data input in airlines are still performed manually. The specific way is as follows: after an aircraft landed, the ground crew manually fill up the tank with the lubricant, and then manually record quantity of added lubricant. Since each time the lubricant in the tank is filled up, the ratio between the quantity of the added lubricant for each time and the operation time between two consecutive additions of lubricant may reflect the lubricant consumption rate within this time period. Information of the added amount of lubricant and the lubricant consumption rate are then input into the data input system of the airline company, and then uploaded to the data server of the airline company. The existing method of adding the lubricant involves a cooperation of many departments and requires a huge amount of manpower. Therefore, human factors and deviations in workflow will unavoidably cause error of data, which also directly affects timeliness of adding lubricant and accuracy of the obtained lubricant consumption data. In addition, time-effectiveness in obtaining data of lubricant addition quantity cannot be guaranteed if it is sent manually, and it also causes failure to obtain information of lubricant consumption in a timely manner. For example, due to requirements on arrangement of airlines operation, some aircrafts often stay overnight at other stations for days, and objective situations at other stations often affects the acquisition of lubricant consumption data.

Although each airline company has being devoted to developing a system capable of automatically monitoring engine lubricant all the way, no airline company has ever brought out such system.

SUMMARY

For the above technical problem existing in the prior art, there is provided, according to one aspect of the present invention. A method for detecting addition of engine lubricant, comprising: determining whether the difference value between the lubricant quantity at a first timing and that at a second timing is greater than a first threshold value; delaying a period and determining whether the difference value between the lubricant quantity at a third timing and that at a fourth timing is greater than a second threshold value in response to that the difference value between the lubricant quantity at the first timing and that at the second timing is greater than the first threshold value; and detecting the lubricant increment in response to that the difference value between the lubricant quantity at the third timing and that at the fourth timing is greater than the second threshold value.

The method as described above further comprises: determining whether the detected lubricant increment is greater than a third threshold value.

For the method described above, wherein the time between the first timing and the second timing is referred to as a first period during which the aircraft is not powered off; and the time between the third timing and the fourth timing is referred to as a second period which is equal to the first period in length.

For the method described above, wherein the difference value between the lubricant quantity at the first timing and that at the second timing is the difference value between the maximum value and the minimum value of the lubricant quantity at the third timing and that at the fourth timing is the difference value between the maximum value and the minimum value of the lubricant quantity during the second period.

For the method described above, wherein the first timing is before the aircraft is powered off, the second timing is after the aircraft is repowered; and the third timing is the same time as the first timing, the fourth timing is later than the second timing.

For the method described above, wherein each of the first threshold value, the second threshold value and the third threshold value is the minimum added amount of lubricant as required in aircraft maintenance.

For the method described above, wherein the step of detecting the lubricant increment comprises:
  obtaining the maximum lubricant increment;
  delaying a period and re-obtaining an lubricant increment;
  determining an interval between two measurements according to the re-obtained lubricant increment;
  re-obtaining lubricant increments for multiple times according to the determined interval; and
  calculating the average value of the lubricant increments re-obtained for multiple times.

For the step of detecting the lubricant increment in the method described above, wherein the interval between two measurements corresponding to a greater re-obtained lubricant increment is less than that corresponding to a smaller re-obtained lubricant increment.

For the method described above, wherein the step of detecting the lubricant increment comprises: determining whether the interval between two of the multiple measurements is greater than the maximum value of delayed time, and calculating the average value of the lubricant increments re-obtained previously in response to that the interval between two of the multiple measurements is greater than the maximum value of delayed time.

For the method described above, wherein the step of detecting the lubricant increment comprises: determining whether the interval between two of the multiple measurements is greater than the determined interval and less than the maximum value of delayed time, and in response to that the interval between two of the multiple measurements is greater than the determined interval and less than the maximum value of delayed time, the lubricant increment re-obtained may be corrected by the following formula: k*DT, wherein DT refers to the re-obtained lubricant increment, k is a regulation coefficient in the range of 1.05-1.35; and calculating the average value of the lubricant increments re-obtained previously and the corrected re-obtained lubricant increment.

For the method described above, wherein the step of detecting the lubricant increment comprises: determining whether the interval between two of the multiple measurements is greater than the determined interval and less than the maximum value of delayed time, and in response to that the interval between two of the multiple measurements is greater than the determined interval and less than the maximum value of delayed time, the lubricant increment re-obtained may be corrected by the following formula: k*DT*(AT−T)/(t−T), wherein DT refers to the lubricant increment re-obtained, k is a regulation coefficient which is 1.35, AT is the interval between two measurements, t is the maximum value of delayed time, T is the determined interval; and calculating the average value of the lubricant increments re-obtained previously and the corrected re-obtained lubricant increment.

The method as described above further comprises: determining whether the difference value between the lubricant quantity at the first timing and that at the second timing is greater than a predetermined threshold, wherein the first timing is within 8-15 minutes after the engine is shutdown, the second timing is later than the lubricant adding period as required for aircraft maintenance.

The method as described above further comprises: determining whether the difference value between the lubricant quantity at a third timing and that at a fourth timing is greater than a predetermined threshold, wherein the third timing is within 8-15 minutes after the engine is shutdown, the fourth timing is within 3-10 seconds before the engine is started.

According to another aspect of the present invention, there is provided a method for detecting addition of engine lubricant, comprising: obtaining a maximum lubricant increment; delaying a period and re-obtaining an lubricant increment; determining an interval between two measurements according to the lubricant increment re-obtained; re-obtaining lubricant increments for multiple times according to the determined interval; and calculating the average of the lubricant increments re-obtained for multiple times.

For the method described above, wherein the interval between two measurements corresponding to a greater lubricant increment re-obtained is less than that corresponding to a smaller lubricant increment re-obtained.

The method as described above further comprises: determining whether the interval between two of the multiple measurements is greater than the maximum value of delayed time, and calculating the average of the lubricant increments re-obtained previously in response to that the interval between two of the multiple measurements is greater than the maximum value of delayed time.

The method as described above further comprises: determining whether the interval between two of the multiple measurements is greater than the determined interval and less than the maximum value of delayed time, and in response to that the interval between two of the multiple measurements is greater than the determined interval and less than the maximum value of delayed time, the lubricant increment re-obtained may be corrected by the following formula: k*DT, wherein DT refers to the lubricant increment re-obtained, k is a regulation coefficient in the range of 1.05-1.35; and calculating the average of the lubricant increments re-obtained previously and the corrected re-obtained lubricant increment.

The method as described above further comprises: determining whether the interval between two of the multiple measurements is greater than the determined interval and less than the maximum value of delayed time, and in response to that the interval between two of the multiple measurements is greater than the determined interval and less than the maximum value of delayed time, the lubricant increment re-obtained may be corrected by the following formula: k*DT*(AT−T)/(t−T), wherein DT refers to the lubricant increment re-obtained, k is a regulation coefficient which is 1.35, AT is the interval between two measurements, t is the maximum value of delayed time, T is the determined interval; and calculating the average of the lubricant increments re-obtained previously and the corrected re-obtained lubricant increment.

The method as described above further comprises: determining whether the difference value between the lubricant quantity at a first timing and that at a second timing is greater than a first threshold value; delaying a period and determining whether the difference value between the lubricant quantity at a third timing and that at a fourth timing is greater than a second threshold value in response to that the difference value between the lubricant quantity at the first timing and that at the second timing is greater than the first threshold value; and detecting the lubricant increment in response to that the difference value between the lubricant quantity at the third timing and that at the fourth timing is greater than the second threshold value.

The method as described above further comprises: determining whether the lubricant increment detected is greater than a third threshold value.

For the method described above, wherein the time between the first timing and the second timing refers to a first period during which there is no power-off; and the time between the third timing and the fourth timing refers to a second period which is equal to the first period wherein the time between the first timing and the second timing is referred to as a first period during which the aircraft is not powered off; and the time between the third timing and the fourth timing is referred to as a second period which is equal to the first period in length.

For the method described above, wherein the difference value between the lubricant quantity at the first timing and that at the second timing is the difference value between the maximum value and the minimum value of the lubricant quantity during the first period; and the difference value between the lubricant quantity at the third timing and that at the fourth timing is the difference value between the maximum value and the minimum value of the lubricant quantity during the second period.

For the method described above, wherein the first timing is before the aircraft is powered-off, the second timing is after the aircraft is repowered; and the third timing is the same time as the first timing, the fourth timing is later than the second timing.

For the method described above, wherein each of the first threshold value, the second threshold value and the third threshold value is the minimum added amount of lubricant as required for aircraft maintenance.

The method as described above further comprises: determining whether the difference value between the lubricant quantity at the first timing and that at the second timing is greater than a predetermined threshold, wherein the first timing is within 8-15 munities after the engine is shutdown, the second timing is later than the lubricant adding period as required for aircraft maintenance.

The method as described above further comprises: determining whether the difference value between the lubricant quantity at the third timing and that at the fourth timing is greater than a predetermined threshold, wherein the third timing is within 8-15 munities after the engine is shutdown, the fourth timing is within 340 seconds before the engine is started.

According to yet another aspect of the present invention, there is provided a system for detecting addition of engine lubricant, comprising: an adding detection module configured to determine whether difference value between the maximum value and the minimum value of the lubricant quantity during a first period is greater than a first threshold value; a verification module configured to determine whether the difference value between the maximum value and the minimum value of the lubricant quantity during the second period is greater than a second threshold value in response to that the difference value between the maximum value and the minimum value of the lubricant quantity during the first period is greater than the first threshold value, wherein the second period is later than the first period; and an increment calculation module configured to detect the lubricant increment in response to that the difference value between the maximum value and the minimum value of the lubricant quantity during the second period is greater than the second threshold value.

For the method described above, wherein the increment calculation module is configured to obtain the maximum lubricant increment; delay a period and re-obtain an lubricant increment; determine an interval between two measurements according to the lubricant increment re-obtained; re-obtain lubricant increments for multiple times according to the determined interval; and calculate the average of the lubricant increments re-obtained for multiple times.

According to an embodiment of the present application, for the increment calculation module in the system as described above, the interval between two measurements corresponding to a greater lubricant increment re-obtained is less than that corresponding to a smaller lubricant increment re-obtained.

The increment calculation module in the system as described above further comprises: the increment calculation module is configured to determine whether the interval between two of the multiple measurements is greater than the maximum value of delayed time, and calculate the average of the lubricant increments re-obtained previously in response to that the interval between two of the multiple measurements is greater than the maximum value of delayed time.

The increment calculation module in the system as described above further comprises: the increment calculation module is configured to determine whether the interval between two of the multiple measurements is greater than the determined interval and less than the maximum value of delayed time, and in response to that the interval between two of the multiple measurements is greater than the determined interval and less than the maximum value of delayed time, the lubricant increment re-obtained may be corrected by the following formula: k*DT, wherein DT refers to the lubricant increment re-obtained, k is a regulation coefficient in the range of 1.05-1.35; and calculate the average of the lubricant increments re-obtained previously and the corrected re-obtained lubricant increment.

The increment calculation module in the system as described above further comprises: the increment calculation module is configured to determine whether the interval between two of the multiple measurements is greater than the determined interval and less than the maximum value of delayed time, and in response to that the interval between two of the multiple measurements is greater than the determined interval and less than the maximum value of delayed time, the lubricant increment re-obtained may be corrected by the following formula: k*DT*(AT−T)/(t−T), wherein DT refers to the lubricant increment re-obtained, k is a regulation coefficient which is 1.35, AT is the interval between two measurements, t is the maximum value of delayed time, T is the determined interval; and calculate the average of the lubricant increments re-obtained previously and the corrected re-obtained lubricant increment.

The system as described above further comprises: a power-off detection module configured to determine whether the difference value between the lubricant quantities after the aircraft is repowered and before the aircraft is powered off is greater than the first threshold value; wherein the verification module is configured to determine whether the difference value between the lubricant quantity after delaying for a period and the lubricant quantity before the aircraft is powered off is greater than the second threshold value in response to that the difference value between the lubricant quantities after the aircraft is repowered and before the aircraft is powered off is greater than the first threshold value; wherein the increment calculation module is configured to detect the lubricant increment in response to that the difference value between the lubricant quantity after delaying for a period and the lubricant quantity before the aircraft is powered off is greater than the second threshold value.

The system as described above further comprises: a lubricant consumption calculation module configured to calculating the lubricant consumption rate of the engine according to the lubricant increment obtained from the increment calculation module and the running time of the engine.

The system as described above further comprises: a lubricant adding event detection module configured to determine whether the difference value between the lubricant quantity at the first time and that at the second time is greater than a predetermined threshold, wherein the first time is within 8-15 minutes after the engine is shutdown, the second time is later than the lubricant adding period as required for aircraft maintenance.

The system as described above further comprises: a lubricant adding event detection module configured to determine whether the difference value between the lubricant quantity at the first time and that at the third time is greater than a predetermined threshold, wherein the first time is within 8-15 munities after the engine is shutdown, the third time is within 3-10 seconds before the engine is started.

According to yet another aspect of the present application, there is provided a method for monitoring engine lubricant, comprising: generating a lubricant adding message in response to that the lubricant has been added into the aircraft; and transmitting the lubricant adding message via a ground transmission device or a ACARS system.

For the method described above, wherein the step of generating a lubricant adding message comprises: determining whether the aircraft is in the period where the aircraft is power-on, engine is started or engine is shut-down; triggering a lubricant adding message trigger in response to that the aircraft is in the period of being power-on, engine starting or engine shut-down; triggering a lubricant increment trigger in response to that the aircraft is in the period of being power-on, engine starting or engine shut-down; the lubricant increment trigger obtains lubricant increment of the engine and transmits the lubricant increment of the engine to the lubricant adding trigger; and the lubricant adding trigger obtains the predetermined parameter of the message and relevant information of lubricant addition and generates the lubricant adding message.

The method described above further comprises: wherein the lubricant adding trigger obtains records of lubricant addition recorded mutually.

The method described above further comprises: if a plurality of lubricant adding events occur, the lubricant increment trigger transmits the total quantity of the lubricant increment.

The method described above further comprises: the lubricant adding trigger calculates the data of lubricant consumption according to the quantity of the added lubricant.

BRIEF DESCRIPTION OF THE FIGURES

Hereinafter, preferred embodiments of the present invention will be further described with reference to the accompany drawings, wherein:

FIG. 7 is a schematic of a customized message, i.e. No. 27 message, according to one embodiment of the present invention;

DETAILED DESCRIPTION

Hereinafter, in order to give a clearer picture of the purposes, technical solutions and advantages of the embodiments of the present invention, the technical solutions in the embodiments of the present invention will be further described, taken in conjunction with the accompanying drawings in the embodiments of the present invention. Apparently, the described embodiments are only part of the invention rather than all embodiments. Based on the embodiments in the present invention, all other embodiments a person with ordinary skill in the art achieves without any creative effort shall fall within the protection scope of the present invention.

In the following detailed description, reference is made to the accompanying drawings, which form a part of the present application to illustrate specific embodiments of the application. In the drawings, similar symbols in different drawings identify substantially similar components. With the following detailed description about each specific embodiment of the present application, an ordinary person with relevant knowledge and technology in the art will be able to implement technical solutions of the present application. It should be appreciated that other embodiments may be utilized or changes in structure, logic or electrical property may be made to the embodiments of the present application.

Although a sensor for detecting lubricant quantity is provided in the lubricant tank of the engine, it is still a challenge to detect the lubricant quantity of the engine accurately. First of all, it is very difficult to detect since the liquid level in the lubricant tank may be in different positions during different phases of flight. Secondly, much other post-flight maintenance, such as power-off for a short time, pulling, adding lubricant repeatedly and the like, shall be done when lubricant is being added, and these will influence detecting the lubricant. Furthermore, the liquid level in the lubricant tank will vary after the addition of lubricant is completed because of the siphonic effect of the engine. In addition, there are also many factors, such as low accuracy of the lubricant quantity sensor, low lubricant consumption of the engine and the like, that makes it very difficult to detect the addition of lubricant automatically.

Figure 1:
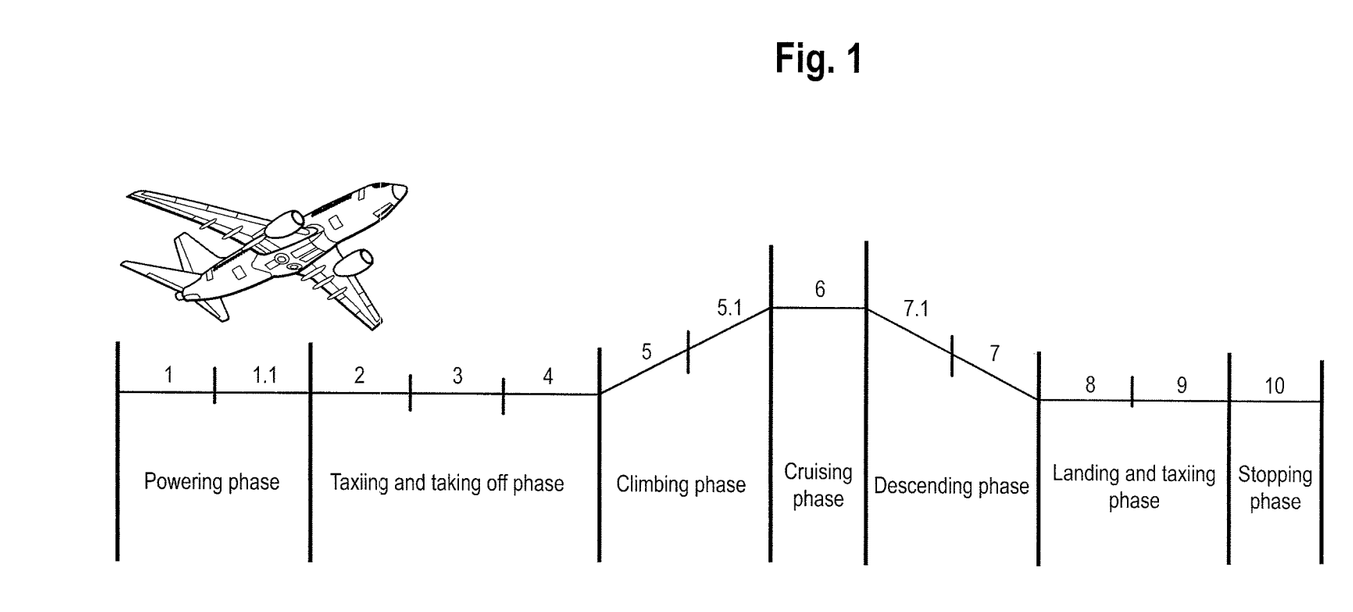
FIG. 1 is a schematic of each flight phase of an aircraft.

FIG. 1 is a schematic illustrating each flight phase of an aircraft. As shown in FIG. 1, the operation of an aircraft comprises: powering phase, taxiing and taking off phase, climbing phase, cruising phase, descending phase, landing phase and stopping phase, wherein the engine starting phase refers to the phase from the powering phase where the aircraft is powered to the starting of the engine and then to the phase before the aircraft starts to taxi; the stopping phase of the engine refers to the phase where the aircraft has finished taxiing and the engine is being shut down after the aircraft has finished taxiing, namely the aircraft stopping phase.

According to one embodiment of the present invention, the system and method for detecting addition of lubricant of an engine of the present invention are mainly applied during the phase after the engine is shut down to automatically detect addition of lubricant, and further to calculate lubricant consumption. In circumstances where the aircraft stops during the journey for a short time period, the system and method of the present invention may also be applied during the phase when the aircraft is powering on and the engine is started. According to one embodiment of the present invention, relevant data and/or middle data resulted after calculation will be automatically stored in a non-volatile storage so as to prevent any loss due to abrupt power off, or be automatically transmitted to a ground workstation and a server of the airline company in the form of various data carriers.

According to one embodiment of the present invention, the system and method of the present invention may use the data acquisition system on the aircraft. Taking the Flight Data Interface and Management Unit (FDIMU) as an example, the FDIMU receives data of aircraft condition from airborne sensors or other devices. Data acquisition subsystem of FDIMU converts the received data of aircraft condition into digital signals for broadcasting. The Quick Access Recorder (OAR) receives and stores the broadcast data of aircraft condition, wherein, a part of the data being stored into the Flight Data Recorder (FDR), namely the "Black Box", so as to be analyzed by relevant persons after any emergency happens to the aircraft.

The data acquisition system on the aircraft obtains data of flight condition of the aircraft at a fixed frequency, comprising data of lubricant quantity from the lubricant quantity sensor. For example, the lubricant quantity sensor transmits the detected data of lubricant quantity to for example data acquisition system of FDIMU every one second or every ½ second. By recording data of lubricant quantity of different time points via the data acquisition system, the system and method of the present invention may realize automatic detection of lubricant addition. Of course, the system for detection lubricant addition may also automatically store data of lubricant quantity at different time points by itself so as to realize automatic detection of lubricant addition.

Since the existing airline company's requirements for engine lubricant service are: addition of lubricant shall be finished within a certain time period after the engine is shut down, the addition of lubricant quantity shall not be less than the lowest quantity of lubricant addition, and lubricant shall be added to the position with a full mark, the method of the present invention shall comply with the above requirements for aircraft maintenance.

Figure 2:
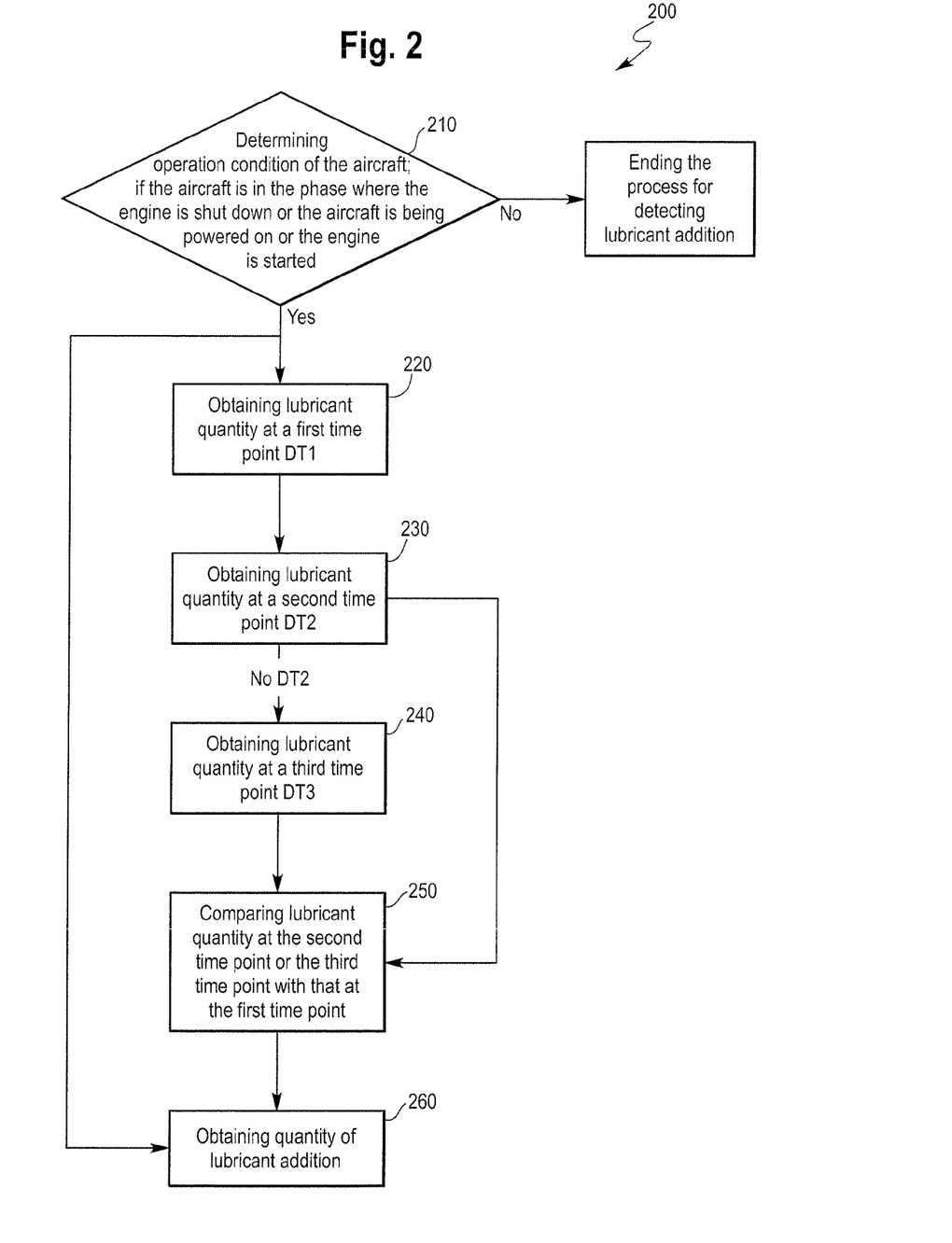
FIG. 2 is a flow chart illustrating a method for detecting lubricant addition according to one embodiment of the present invention.

FIG. 2 is a flow chart illustrating a method for detecting lubricant addition according to one embodiment of the present invention. As shown in FIG. 2, the lubricant addition detection method 200 comprises: in step 210, determining operation condition of the aircraft; if the aircraft is in the phase where the engine is shut down or the aircraft is being powered on or the engine is started, then initiating or carrying on the detection of lubricant addition of the present invention; otherwise, ending the process for detecting lubricant addition. In step 220, obtaining lubricant quantity at a first time point; in step 230, obtaining lubricant quantity at a second time point, wherein the second time point is later than the first time point. According to one embodiment of the present invention, the first time point is 8 to 15 minutes after the engine is shut down, preferably 10 minutes. The second time point is later than the time for adding lubricant required by the aircraft maintenance, preferably 10 to 20 minutes late. For example, if the aircraft maintenance requires that the lubricant be added within 30 minutes after the engine is shut down, then the second time point may be 45 minutes after the engine is shut down. If there is no second lubricant quantity for the second time point, then in step 240, obtaining lubricant quantity at a third time point. According to one embodiment of the present invention, the third time point is point within 3 to 10 seconds before the engine is started, preferably 5 seconds before the engine is started.

In step 250, comparing lubricant quantity at the second time point or the third time point with that at the first time point; if the increase of lubricant quantity is larger than a preset threshold value, then lubricant is added during this time period; otherwise, no lubricant is added. According to one embodiment of the present invention, the preset threshold value is the lowest quantity of addition required by aircraft maintenance or more.

After step 210, obtaining quantity of lubricant addition at step 260; or after step 250, obtaining quantity of lubricant addition at step 260.

Although when no lubricant is added, lubricant quantity at the first, second and third time points shall substantially the similar, through which one may determine whether lubricant is added, lubricant quantity in the tank will decrease gradually after the addition of lubricant due to various reasons as introduced above, the siphonic effect in particular, therefore, the accurate quantity of lubricant addition cannot be determined by directly calculating difference between the lubricant quantity at the second time point or third time point and that at the first time point.

Figure 3:
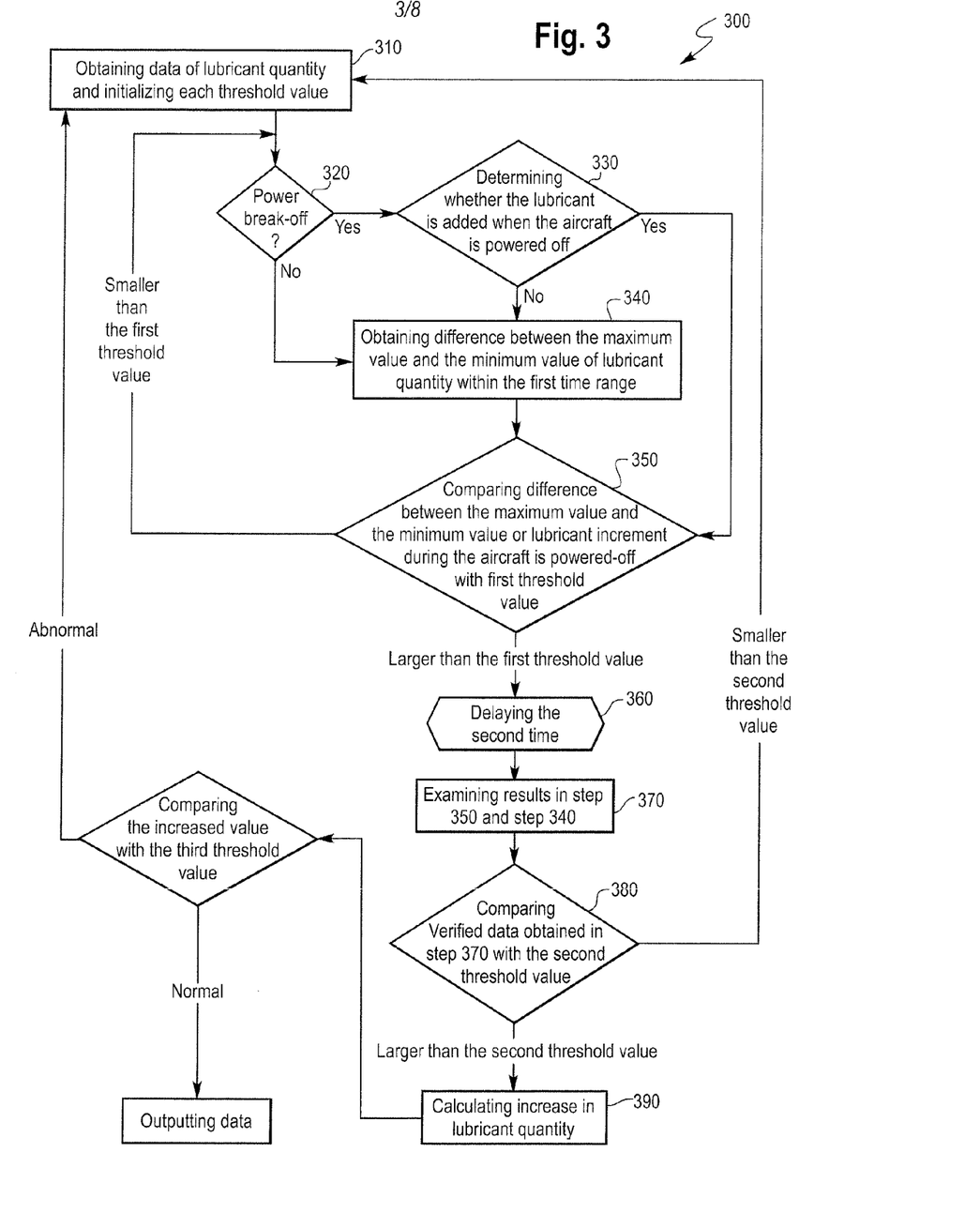
FIG. 3 is a flow chart illustrating a method for obtaining lubricant addition quantity according to one embodiment of the present invention.

FIG. 3 shows a way for obtaining quantity of lubricant addition according to one embodiment of the present invention. As shown in the figure, the method 300 for obtaining quantity of lubricant addition of the present embodiment comprises: in step 310, obtaining data of lubricant quantity and initializing each threshold value. In step 320, detecting power break-off and determining whether a temporary power break-off happens to the aircraft and the aircraft being repowered. After an aircraft stops, its power supply will often be converted from the inner power source of the aircraft to an external power source of the airport, during which circumstance where the aircraft is powered off suddenly and then repowered might occur. This also might happen during other maintenance work of the aircraft or other situations. According to one embodiment of the present invention, the system for detecting lubricant addition of the present invention comprises a non-volatile storage. Temporary data generated during the execution of the method for detecting lubricant addition of the present invention are stored or backed up in the non-volatile storage. Hence, one may be able to determine whether the aircraft was powered off. Data will not be lost after the aircraft is powered off and the system may work normally after the aircraft is repowered.

If the aircraft is powered off and then repowered, then in step 330, determining whether the lubricant is added when the aircraft is powered off. For example, determining whether the quantity of lubricant after the aircraft is repowered is larger than that before the aircraft is powered off. If the lubricant is added, then turn to step 350.

If no addition of lubricant is detected in the situation where the aircraft is repowered after being powered off or during the aircraft is powered off, then in step 340, determining quantity of lubricant of each second within a first time scope, and determining the maximum value and minimum value within the first time scope. According to one embodiment of the present invention, the first time scope comprises the time period from the first time before the current time point to the current time point, for example, 20 to 40 seconds before the current time point, preferably 30 seconds before the current time point.

In step 350, determining whether difference between the maximum value and the minimum value of lubricant quantity within the first time range resulted from in step 340 is larger than a first threshold value, or whether difference between the lubricant quantity after the aircraft is repowered and that before the aircraft is powered off is larger than the first threshold value. According to one embodiment of the present invention, the first threshold value equals to or is larger than the minimum quantity of lubricant addition required by aircraft maintenance.

If it is smaller than the first threshold value, namely lubricant addition does not meet the requirement, then return to step 320 for detecting power off of the aircraft. If it is larger than the first threshold value, then in step 360, delaying the second time. According to one embodiment of the present invention, range of the second time is 5 to 20 seconds, preferably 10 seconds. And then, in step 370, examining results in step 350 and step 340 so as to avoid fluctuation of liquid level and error in the measurement of sensors, comprising re-obtaining difference between the maximum value and minimum value of lubricant quantity according to method in step 350, or re-obtaining increase of lubricant quantity according to method in step 340; and then in step 380, comparing verified data obtained in step 370 with the second threshold value; if the verified data resulted in step 370 is larger than the second threshold value, than it may be determined that addition of lubricant actually happens. Otherwise, return to step 310. According to one embodiment of the present invention, the second threshold value equals to or is larger than the first threshold value.

Through steps 320-370, a majority of changes in data of lubricant quantity measured by lubricant sensors caused by non-lubricant addition event may be excluded via the method for detection lubricant addition of the present invention. Via the setting of the first and second threshold values, changes in lubricant quantity caused by error of sensors and disturbance with small amplitude may be filtered. Via obtaining difference between the maximum value and minimum value of lubricant quantity within the first time and extended verification, changes in lubricant quantity caused by tilting and vibration with larger amplitude of liquid level of lubricant quantity caused by dragging the aircraft may be avoided so as to more accurately detect the lubricant quantity.

If lubricant is added, then in step 390, calculating increase in lubricant quantity, and comparing the increased value of lubricant quantity resulted from the calculation with the third threshold value; if the result of the comparison is normal, then the system outputs data of value of increase of lubricant quantity. Otherwise, return to step 310, re-detecting event where lubricant is added.

Figure 4:
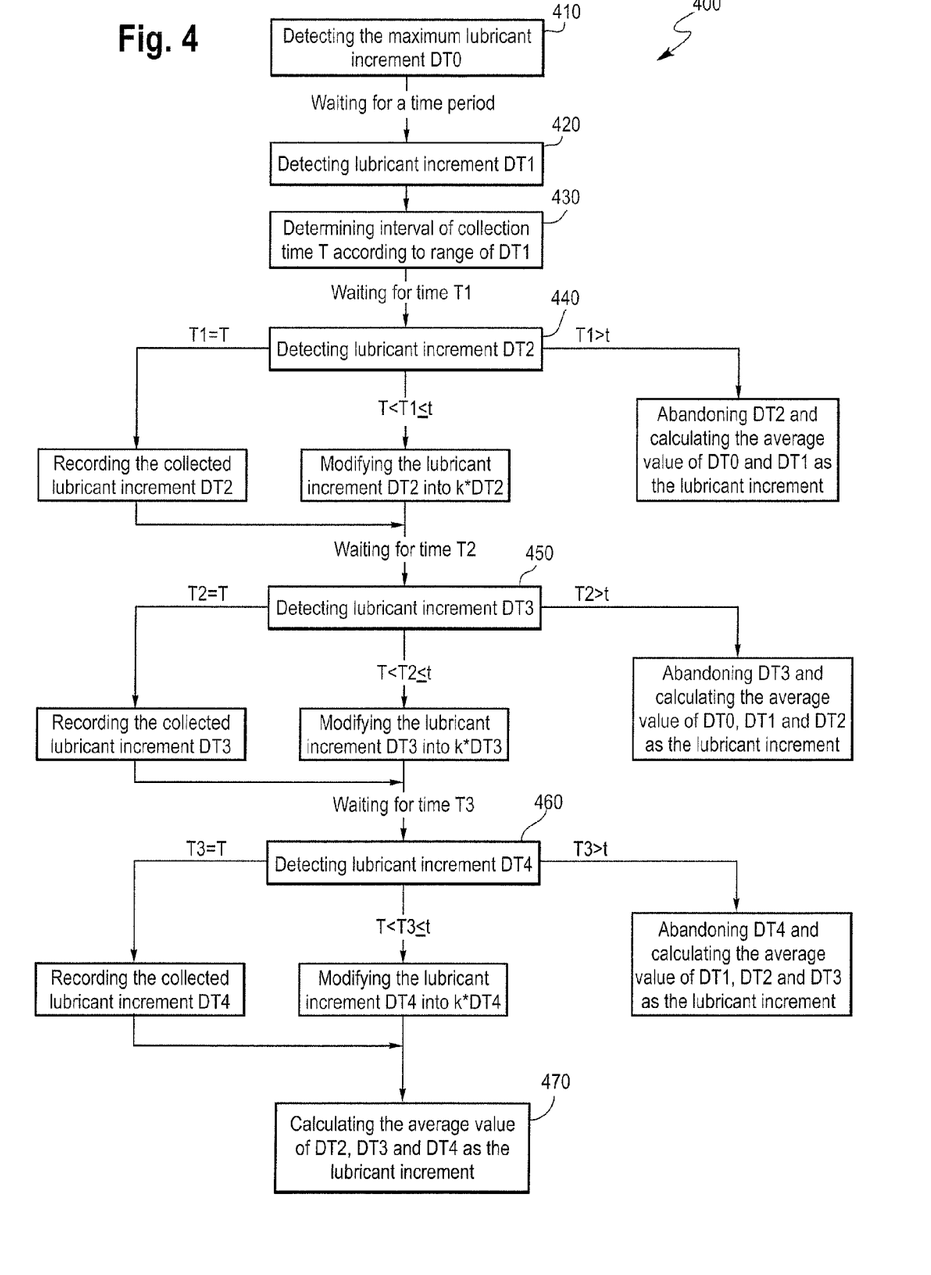
FIG. 4 is a flow chart illustrating calculation of lubricant increment according to one embodiment of the present invention.

FIG. 4 is a flow chart illustrating the calculation of lubricant increment according to one embodiment of the present invention. As shown in FIG. 4, the method 400 for calculating increment of lubricant comprises the following steps: in step 410, detecting the maximum lubricant increment DT0. For the event of an addition of lubricant, during the process of adding lubricant, lubricant quantity in the tank keeps increasing. At a certain point, the lubricant quantity ceases to increase. Difference between the lubricant quantity at this time and that when the addition of lubricant is started or before that is the maximum lubricant increment DT0.

In step 420, after waiting for a time period, again detecting lubricant increment DT1 and determining range of lubricant increment DT1. According to one embodiment of the present invention, range of the waiting time is 20 to 50 seconds, preferably 30 seconds.

According to one embodiment of the present invention, after the maximum lubricant increment added into the tank of the engine is obtained, disturbance or vibration of the liquid level, error in measurements and other factors may be excluded via calculating average value for multiple measurements. If time interval between each measurement is too short, it will not help to exclude those disturbing factors. However, due to siphonic effect, a part of lubricant will go back to engine assemblies such that lubricant quantity will gradually decrease as time passes by. Hence, if time interval between each measurement is too big, the siphonic effect will affect accuracy of the measurement. Therefore, in order to make the calculated lubricant increment more close to the actual quantity of lubricant addition, collection time intervals with respect to different lubricant increase quantities may be different correspondingly. Collection time intervals with respect to small lubricant increment may be shortened, while collection time intervals with respect to large lubricant increment may be properly extended.

In step 430, according to range of DT1, interval of collection time T is determined. As stated above, different lubricant increment shall correspond to different interval of increment collection time. For example, for lubricant increment smaller or equivalent to 0.75 QT, interval of different collections is around 1 minute in general; for lubricant increment larger than 0.75 QT and smaller than or equivalent to 1.5 QT, interval for different collections is around 2 minutes in general; for lubricant increment larger than 1.5 QT, interval for different collections is around 3 minutes in general.

In step 440, after actually waiting for time T1, detecting lubricant increment DT2; and comparing the actually waiting time T1 with interval of collections T. If T1 equals to T, it means that the collection is normal, then recording the collected lubricant increment DT2. If T1 is larger than the maximum time delay value t, it means that the increment calculation has been interrupted too long and situations such as the aircraft being powered off might occur and the aircraft is not repowered for a long time. This is because that the increment detected at this time will not be affected to a overly small extent by the siphonic effect, and thus the detected increment DT2 is abandoned, and average value of DT0 and DT1 detected previously may serve as the final lubricant increment DT and calculation of increment is ended. If T1 is larger than collection interval T and not more than the maximum time delay value t, it means that calculation of increment is interrupted, for example by a power break-off, but the detected increment is not obviously affected by the siphonic effect. According to one embodiment of the present invention, the collected lubricant increment DT2 is modified at this time into k*DT2 which is served as the detection increment. Range of value of k is 1.05-1.35, preferably 1.2. According to another embodiment of the present invention, the collected lubricant increment DT2 is modified at this time into k*DT2*(AT−T)/(t−T) wherein k is the modifying coefficient, value of k is 1.35, AT is the actual time interval, t is the maximum time delay, and T is a determined time interval. According to one embodiment of the present invention, the maximum time delay t is the time for completing one addition of lubricant, and range of its value is 8-12 minutes, preferably 10 minutes.

Similarly, in step 450, after actually waiting for time T2, detecting lubricant increment DT3; and comparing the actually waiting time T2 with interval of collections T. If T2 equals to T, then recording the collected lubricant increment DT3. If T2 is larger than the maximum time delay value t, and then the detected increment DT3 is abandoned, and average value of DT0, DT1 and DT2 detected previously may serve as the final lubricant increment DT and calculation of increment is ended. If T2 is larger than collection interval T and not more than the maximum time delay value t, according to one embodiment of the present invention, the collected lubricant increment DT3 is modified at this time into k☐*DT3 which is served as the detection increment. Range of value of k is 1.054.35, preferably 1.2. According to another embodiment of the present invention, the collected lubricant increment DT3 is modified at this time into km*DT3*(AT−T)/(t−T) wherein k is the modifying coefficient, value of k is 1.35, AT is the actual time interval, t is the maximum time delay, and T is a determined time interval. According to one embodiment of the present invention, the maximum time delay t is the time for completing one addition of lubricant, and range of its value is 8-12 minutes, preferably 10 minutes.

Similarly, in step 460, after actually waiting for time T3, detecting lubricant increment DT4; and comparing the actually waiting time T3 with interval of collections T. If T3 equals to T, then recording the collected lubricant increment DT4. If T3 is larger than the maximum time delay value t, and then the detected increment DT4 is abandoned, and average value of DT1, DT2 and DT3 detected previously may serve as the final lubricant increment DT and calculation of increment is ended. If T3 is larger than collection interval T and not more than the maximum time delay value t, according to one embodiment of the present invention, the collected lubricant increment DT4 is modified at this time into k□*DT4 which is served as the detection increment. Range of value of k is 1.05-1.35, preferably 1.2. According to another embodiment of the present invention, the collected lubricant increment DT4 is modified at this time into k*DT4*(AT−T)/(t−T) wherein k is the modifying coefficient, value of k is 1.35, AT is the actual time interval, t is the maximum time delay, and T is a determined time interval. According to one embodiment of the present invention, the maximum time delay t is the time for completing one addition of lubricant, and range of its value is 8-12 minutes, preferably 10 minutes.

Then, in step 470, if DT2, DT3 and DT4 are recorded, then using average value of the detected lubricant increment DT2, DT3 and DT4 as the final lubricant increment DT, and ending the calculation of increment.

According to one embodiment of the present invention, time of addition of the final lubricant increment DT is recorded, namely adding a timestamp to the final lubricant increment DT. As such, if multiple times for adding lubricant occur, multiple lubricant increments with different timestamps will be obtained. The total amount of lubricant addition may be obtained by combining these lubricant increments.

The above embodiment fully considers that the aircraft might be powered off during the calculation of quantity of lubricant addition. For example, after the aircraft finishes working, power supply of the aircraft may be cut off or be converted to an external power source. The break-off of power supply will suspend calculation of increment. Although calculation of increment will continue after the aircraft is repowered, if time of suspension is too long, accuracy of calculation of lubricant increment will be affected as lubricant increment will change with time. The lubricant increment resulted by using the above method may avoid influence caused by siphonic effect resulted from long time beak-off of power on the calculation of lubricant increment, which may ensure accuracy of the resulted lubricant increment.

Figure 5:
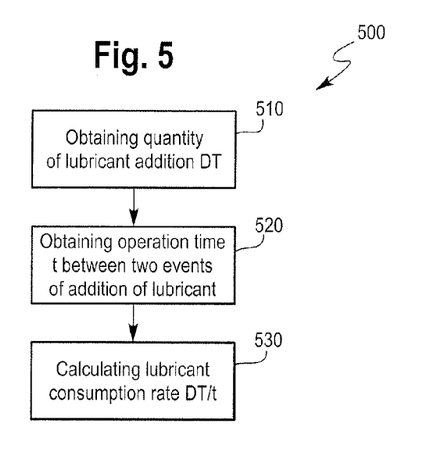
FIG. 5 is a flow chart illustrating a method for calculating lubricant consumption according to one embodiment of the present invention.

FIG. 5 is a flow chart illustrating a method for calculating lubricant consumption according to one embodiment of the present invention, According to one embodiment of the present invention, the lubricant consumption calculation method 500 comprises: in step 510, obtaining quantity of lubricant addition DT. The methods in FIG. 2, FIG. 3 and FIG. 4 may be applied in the present embodiment to obtain an accurate quantity of lubricant addition. Since the lubricant increment calculated by using the method of the present invention has a relatively high accuracy, the lubricant consumption rate resulted therefrom is also closer to the actual lubricant consumption of the engine.

In step 520, obtaining operation time t between two events of addition of lubricant. Unlike traditional way of lubricant consumption calculation, the present embodiment does not use flight time of the aircraft, namely time on wing between a taking-off and a landing, as the basis for calculating lubricant consumption. This is because that the engine may have already started or is still operating before the aircraft takes off and after the aircraft is landed, deviation in the lubricant consumption calculated by using the traditional means is relative large. Especially for the monitoring of performance of an engine, the traditional way of calculating the lubricant consumption may produce wrong warnings. In step 530, lubricant consumption rate DT/t is calculated.

The system and method for detecting addition of lubricant of an engine of the present invention may be implemented in an aircraft in various forms. According to one embodiment of the present invention, the system for detecting addition of lubricant of the present invention is implemented on the aircraft in the form of an airborne hardware.

Figure 6:
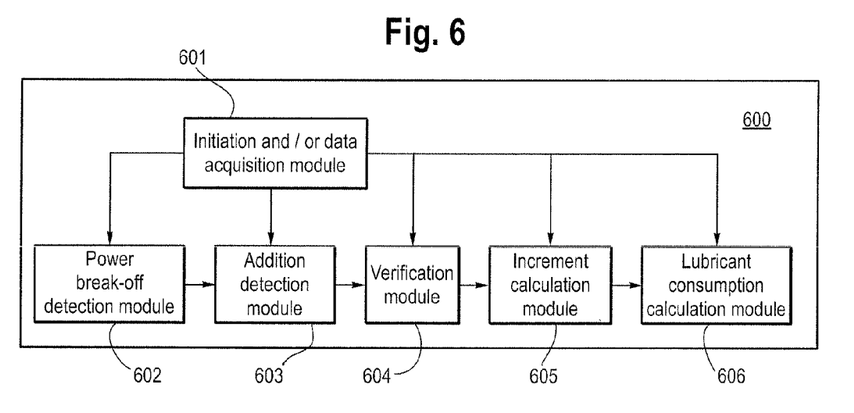
FIG. 6 is a schematic of the structure of a system for detecting lubrication addition of an engine according to one embodiment of the present invention.

FIG. 6 is a schematic of the structure of a system for detecting addition of lubricant of an engine according to one embodiment of the present invention. As shown in FIG. 6, the system 600 for detecting addition of lubricant comprises multiple function modules: an initiation and/or data acquisition module 601, a power break-off detection module 602, an addition detection module 603, a verification module 604, an increment calculation module 605 and a lubricant consumption calculation module 606.

The initiation and data acquisition module 601 is connected to other modules to initiate the lubricant addition detection system 600, and assign a value to each parameter related to detection of lubricant addition. The initiation and data acquisition module 601 may obtain data of the current quantity of lubricant from sensor in the lubricant tank or from the FDIMU in a real-time manner, and also may obtain previous data of lubricant quantity from the Quick Access Recorder (OAR) or other data sources to initiate detection of lubricant addition. According to one embodiment of the present invention, the initiation and data acquisition module 601 may be replaced by an independent initiation module and a data acquisition module.

The power break-off detection module 602 determines and process power break-off of the aircraft. If the addition of lubricant is performed when the aircraft is powered off, the power break-off module 602 determines whether lubricant is added during the power break-off after the aircraft is repowered. For example, determining whether difference between the lubricant quantity after the aircraft is repowered and that before the power break-off is larger than the minimum quantity of lubricant addition required by aircraft maintenance.

The addition detection module 603 detects the addition of lubricant. For example, the addition detection module 603 collects, at every second, lubricant quantity within the range of 30 seconds, and then determines whether difference between the maximum value and the minimum value of the lubricant quantity within the 30 seconds is larger than the minimum quantity of lubricant addition required by the aircraft maintenance.

The verification module 604 is connected to the addition detection module 603 to eliminate wrong determination of the system. For example, after a certain time period is extended, the verification module 604 recalculates the difference between the maximum value and the minimum value of the lubricant quantity within the 30 seconds is larger than the minimum quantity of lubricant addition required by the aircraft maintenance.

The increment calculation module 605 is connected to the verification module 604 to obtain an accurate quantity of lubricant addition. The increment calculation module 605 obtains quantity of lubricant addition by calculating average value of multiple measurements, and time interval between different measurements varies according to different lubricant increment. For small lubricant increment, the time interval between different measurements is even shorter, while time interval for larger lubricant increment is longer. If the aircraft is powered off during obtaining quantity of lubricant addition, then stopping the measurement. According to one embodiment of the present invention, the increment calculation module 605 utilizes timestamp updating algorithm to solve the problem of data calculation caused by multiple additions of lubricant, and finally obtains lubricant increment relatively approaching the actual quantity of lubricant addition.

The lubricant consumption calculation module 606 is connected to the increment calculation module 605 to obtain lubricant consumption rate of the engine according to the resulted lubricant increment and the detected operation time of the engine, so as to monitor performance of the engine in a real-time manner.

According to one embodiment of the present invention, the lubricant addition detection system 600 further comprises a lubricant addition event detection module for obtaining lubricant quantity at for example 10 minutes after the engine is shut down, 45 minutes after the engine is shut down or 5 seconds before the engine is started, comparing lubricant quantity at 10 minutes after the engine is shut down and that at 45 minutes after the engine is shut down or at 5 seconds before the engine is started, and determining whether there is a lubricant addition event.

According to one embodiment of the present invention, the system for detecting lubricant addition of an engine of the present invention may be implemented on an airborne computer in the form of software. Similar to the embodiment in FIG. 6, the system for detecting lubricant addition may comprise multiple function modules: an initiation and/or data acquisition module, a power break-off detection module, an addition detection module, a verification module, an increment calculation module and a lubricant consumption calculation module. Functions of these modules are similar to that of each module in the embodiment in FIG. 6, and thus will not be repeatedly illustrated here.

According to one embodiment of the present invention, the system for detecting lubricant addition of an engine of the present invention is implemented on the Aircraft Condition Monitoring System (ACMS) of the FDIMU.

The ACMAS monitors, collects and records data of aircraft condition, and outputs preset data of aircraft condition when triggered by certain condition so as to be used by the flight crew and maintenance staff to monitor the aircraft condition and performances daily. It is referred to as Message as it data content and format may be changed by the user.

The ACMS message is generated under the control of integrated application software. A message is triggered by a certain threshold of parameters of aircraft condition or combinational logic of a multiple parameters of aircraft condition, namely, by a certain message triggering logic. The ACMS message generated by the message triggering logic designed and tested by the ACMS producer is referred to as Basic Message. Many basic messages have become standards stipulated by Civil Aviation Administration Authority. A320 aircrafts of Airbus are taken as an example and the number of ACMS basic messages they use is over 20.

A customized message may be generated via designing the ACMS message trigger logic on one's own. With the customized message, a person skilled in the art may be no longer limited by the parameters in the basic messages, and may directly face thousands of parameters of aircraft condition, which comprises lubricant quantity of the engine.

FIG. 7 is a schematic of a customized message, namely the No. 27 message, according to one embodiment of the present invention. As shown in the figure, the No. 27 message comprises four portions: the first portion comprises message preset parameters, such as aircraft number, flight number, leg and so forth, and message ending time 27TMR, lubricant changing verification time CKTMR, lubricant increment determination stopping time ENDTMR, lubricant addition increment threshold value DETQ, lubricant addition ending determination increment threshold value ENDTQ, collection maximum time interval OIQEXT. The second portion comprises: lubricant quantity at 10th minute after the engine is shut down and the recorded time and lubricant quantity at 45th minute after the engine is shut down or at 5th second before the next time the engine is started and the recorded time. The third portion is the main portion of No. 27 message, which may be divided into 4 sections. Section 1 is information relating to lubricant addition, comprising: mark of lubricant addition, starting time point of the addition, mark of lubricant addition during a power break-off, lubricant quantity at 20th second before the addition, starting lubricant quantity, historical data of lubricant quantity. Section 2 is information of lubricant addition of the left engine, comprising: lubricant increment of the left engine and the corresponding recording time. Section 3 is information of lubricant addition of the right engine, comprising: lubricant increment of the right engine and the corresponding recording time. Section 4 is information of lubricant consumption. If lubricant is added, that calculated lubricant consumption of the engine is displayed, comprising lubricant consumption on air and lubricant consumption on air and on the ground. Section 4 also comprises the following information: average value of the lubricant increment, lubricant increment and amount of effective lubricant increment. In order to be compatible with existing way of manually recording lubricant addition, and further determining information of lubricant addition, Section 4 of No. 27 message comprises: if the quantity of lubricant addition is manually input in the cockpit, then recording quantity of lubricant addition, hours of the engine in air, lubricant consumption and identification number of employee.

Figure 8:
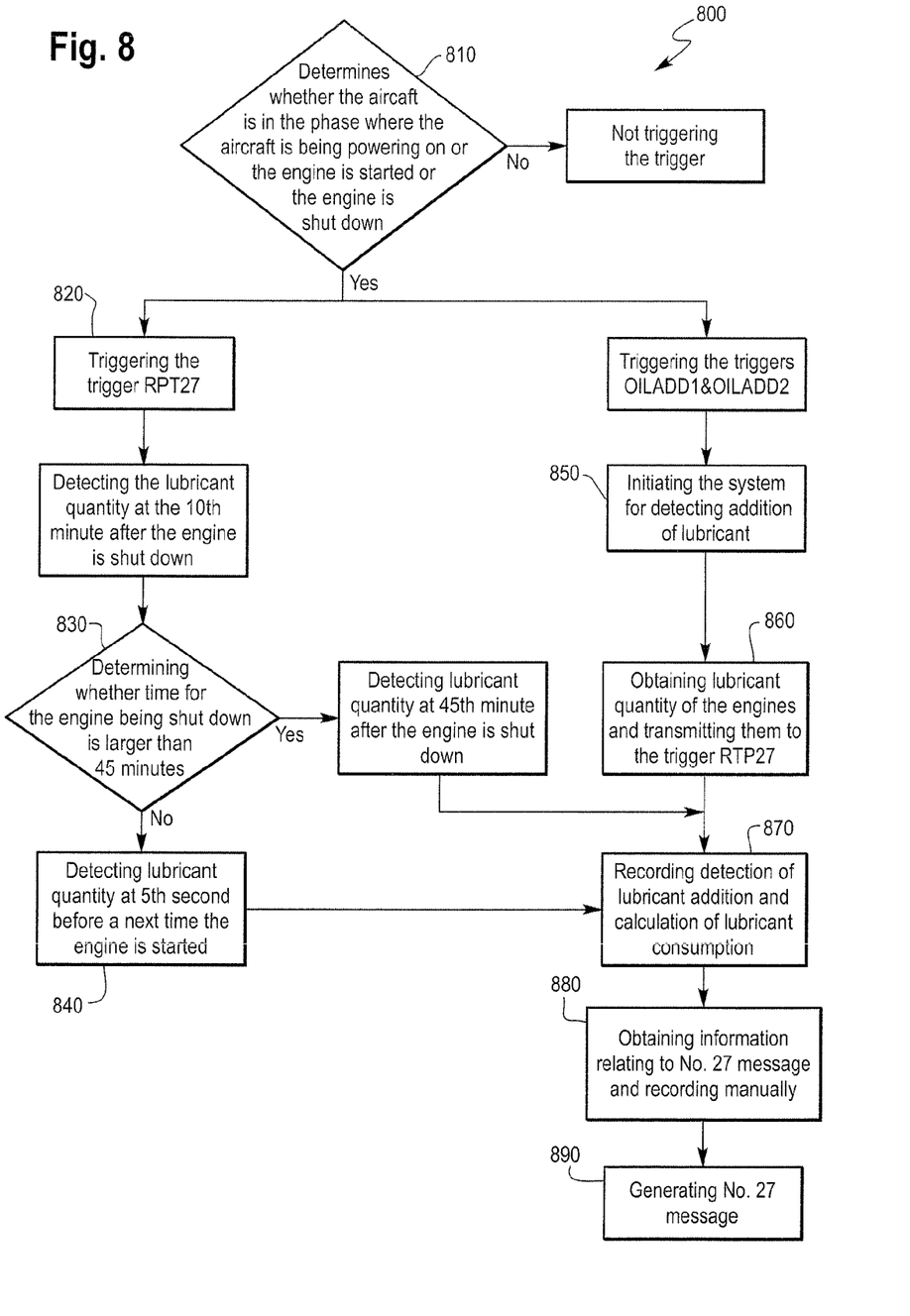
FIG. 8 is a flow chart illustrating a method for generating No. 27 message according to one embodiment of the present invention.

FIG. 8 is a flow chart illustrating a method for generating No. 27 message according to one embodiment of the present invention. As shown in FIG. 8, the method 800 for generating No. 27 message comprises the following steps: in step 810, basic trigger (or process) in the ACMS determines whether the aircraft is in the phase where the aircraft is being powering on or the engine is started or the engine is shut down. If the result is "No", then do not trigger any trigger, and do not initiate the system for detecting lubricant addition; if the result is "YES", then trigger the No. 27 message trigger RTP27 and the first and second lubricant increment trigger OILADD1 and OILADD2.

The basic trigger in the ACMS is a process that the ACMS system keeps running after being started. Each trigger for generating various messages is triggered by the basic trigger. The process for generating No. 27 message may be triggered by adding the trigger logic of No. 27 message into the basic trigger, for example whether the aircraft is in the phase where the aircraft is powered on or the engine is started or the engine is shut down and corresponding following actions. According to one embodiment of the present invention, the No. 27 message trigger RTP27 and the first and second lubricant increment trigger OILADD1 and OILADD2 may also be triggered by other triggers such as trigger for monitoring operation condition of the aircraft.

In step 820, the trigger RPT27 detects lubricant quantity at the 10th minute after the engine is shut down. In step 830, the trigger RPT27 detects whether time for the engine being shut down is larger than 45 minutes, if the result of the determination is "YES", then detecting lubricant quantity at 45th minute after the engine is shut down; if the result of the determination is "NO", then in step 840, the trigger RPT27 detects lubricant quantity at 5th second before a next time the engine is started. At the same time, in step 850, the trigger OILADD1 and OILADD2 initiate the system for detecting addition of lubricant, wherein the trigger OIL-ADD1 used for detecting lubricant increment of the left engine, while the trigger OILADD2 used for detecting lubricant increment of the right engine. This system for detecting addition of lubricant may be implemented in the form of an airborne hardware, and may also be implemented on an airborne computer in the form of a software, or be implemented in the form of a software on ACMS. In step 860, lubricant quantity of the left and eight engines may be obtained and transmitted to the trigger RTP27. If multiple additions of lubricant exist, then the final total amount of lubricant increment is transmitted. In step 870, the trigger RTP27 recording detection of lubricant addition and calculation of lubricant consumption to obtain the added lubricant quantity and data of lubricant consumption. In step 880, the trigger RPT27 obtains preset parameters of No. 27 message and information relating to addition of lubricant, and manual record of lubricant addition. Finally, in step 890, the trigger RPT27 generates No. 27 message.

Figure 9:
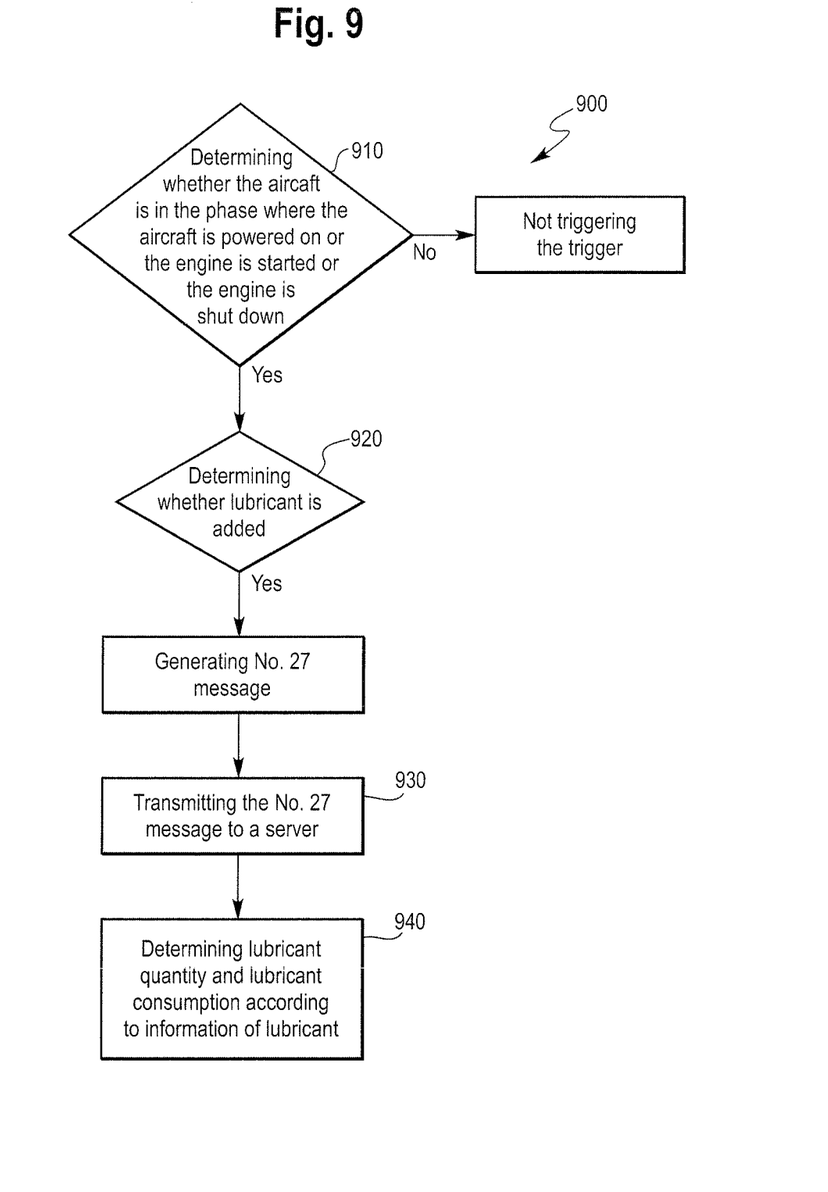
FIG. 9 is a schematic of a method for monitoring lubricant of an engine according to one embodiment of the present invention.

FIG. 9 is a schematic of a method for monitoring lubricant of an engine according to one embodiment of the present invention. As shown in FIG. 9, the method 900 for monitoring lubricant quantity of an engine comprises: in step 910, determining whether the aircraft is in the phase where the aircraft is powered on or the engine is started or the engine is shut down; in step 920, determining whether lubricant is added during this time period; if lubricant is added, then generating a corresponding No. 27 message; in step 930 transmitting the No. 27 message to a server of the airline company via a ground transmission device or the ACARS system; and in step 940, determining lubricant quantity in the current engine and lubricant consumption during the previous journey according to information of lubricant increment recorded in the No. 27 message and the existing information of lubricant, so as to realize monitoring lubricant quantity of the engine. According to one embodiment of the present invention, the No. 27 message may automatically enter into the system for monitoring lubricant quantity of the engine so as to realize automatically monitoring of lubricant quantity of the engine.

Compared with prior art, the system for detecting lubricant addition of the present invention may automatically collect lubricant quantity of an engine and calculate lubricant consumption rate of the engine, and transmit the same to a ground station for analyzing, which solves problem in accuracy and time-effectiveness in traditional way of monitoring lubricant consumption of the engine, improve flight safety. Meanwhile, it may reduce effect caused by a power break-off to the detection of data, greatly improving reliability of the detected data.

The above embodiments are only described for illustrating the present invention, and do not mean to limit the present invention. A person with ordinary skill in relevant art may make various changes and variations without departing from the scope of the present invention. Therefore, all equivalent technical solutions shall also fall within the disclosure of the present invention.

We claim:

1. A method for detecting addition of engine lubricant for an aircraft engine, comprising:

determining, using an adding detection module, whether the difference value between the lubricant quantity at a first timing and that at a second timing is greater than a first threshold value;

delaying a period and determining, using a verification module, whether the difference value between the lubricant quantity at a third timing and that at a fourth timing is greater than a second threshold value in response to that the difference value between the lubricant quantity at the first timing and that at the second timing is greater than the first threshold value; and detecting, using an increment calculation module, the lubricant increment in response to that the difference value between the lubricant quantity at the third timing and that at the fourth timing is greater than the second threshold value, wherein the detecting the lubricant increment comprises obtaining a maximum lubricant value, delaying a period and re-obtaining a lubricant increment value, re-obtaining lubricant increment values for multiple times at intervals equivalent to a duration of the period; and calculating an average increment value of the lubricant increments.

2. The method of claim 1, further comprises: determining whether the detected lubricant increment is greater than a third threshold value.

3. The method of claim 1, wherein the time between the first timing and the second timing is referred to as a first period during which the aircraft is not powered off; and the time between the third timing and the fourth timing is referred to as a second period which is equal to the first period in length.

4. The method of claim 3, wherein the difference value between the lubricant quantity at the first timing and that at a second timing is the difference value between the maximum value and the minimum value of the lubricant quantity during the first period; and the difference value between the lubricant quantity at the third timing and that at the fourth timing is the difference value between the maximum value and the minimum value of the lubricant quantity during the second period.

5. The method of claim 1, wherein the first timing is before the aircraft is powered off, the second timing is after the aircraft is repowered; and the third timing is the same time as the first timing, the fourth timing is later than the second timing.

6. The method of claim 1, wherein each of the first threshold value and the second threshold value is the minimum added amount of lubricant as required in aircraft maintenance.

7. The method of claim 1, wherein the interval between two measurements corresponding to a greater re-obtained lubricant increment is less than that corresponding to a smaller re-obtained lubricant increment.

8. The method of claim 1, further comprising: determining whether the interval between two of the multiple measurements is greater than the maximum value of delayed time, and calculating the average value of the lubricant increments re-obtained previously in response to that the interval between two of the multiple measurements is greater than the maximum value of delayed time.

9. The method of claim 1, further comprising: determining whether the interval between two of the multiple measurements is greater than the determined interval and less than the maximum value of delayed time, and in response to that the interval between two of the multiple measurements is greater than the determined interval and less than the maximum value of delayed time, the lubricant increment re-obtained may be corrected by the following formula: k*DT, wherein DDT refers to the re-obtained lubricant increment, k is a regulation coefficient in the range of 1.05-1.35; and calculating the average value of the lubricant increments re-obtained previously and the corrected re-obtained lubricant increment.

10. The method of claim 1, wherein further comprising: determining whether the interval between two of the multiple measurements is greater than the determined interval and less than the maximum value of delayed time, and in response to that the interval between two of the multiple measurements is greater than the determined interval and less than the maximum value of delayed time, the lubricant increment re-obtained may be corrected by the following formula: $k*DT*(AT-T)/(t-T)$, wherein DT refers to the lubricant increment re-obtained, k is a regulation coefficient which is 1.35, AT is the interval between two measurements, t is the maximum value of delayed time, T is the determined interval; and calculating the average value of the lubricant increments re-obtained previously and the corrected re-obtained lubricant increment.

11. The method of claim 1, further comprising: determining whether the difference value between the lubricant quantity at the first timing and that at the second timing is greater than a predetermined threshold, wherein the first timing is within 8-15 minutes after the engine is shutdown, the second timing is later than the lubricant adding period as required for aircraft maintenance.

12. The method of claim 1, further comprising: determining whether the difference value between the lubricant quantity at a third timing and that at a fourth timing is greater than a predetermined threshold, wherein the third timing is within 8-15 minutes after the engine is shutdown, the fourth timing is within 3-10 seconds before the engine is started.

13. A method for detecting addition of engine lubricant, comprising:
obtaining, using an increment calculation module, a maximum lubricant increment;
delaying a period and re-obtaining an lubricant increment, using the increment calculation module;
determining, using the increment calculation module, an interval between two measurements according to the lubricant increment re-obtained;
re-obtaining, using the increment calculation module, lubricant increments for multiple times according to the determined interval; and
calculating, using the increment calculation module, the average of the lubricant increments re-obtained for multiple times.

14. The method of claim 13, wherein the interval between two measurements corresponds to a greater lubricant increment re-obtained is less than that corresponding to a smaller lubricant increment re-obtained.

15. The method of claim 13, further comprising: determining whether the interval between two of the multiple measurements is greater than the maximum value of delayed time, and calculating the average of the lubricant increments re-obtained previously in response to that the interval between two of the multiple measurements is greater than the maximum value of delayed time.

16. The method of claim 13, further comprising: determining whether the interval between two of the multiple measurements is greater than the determined interval and less than the maximum value of delayed time, and in response to that the interval between two of the multiple measurements is greater than the determined interval and less than the maximum value of delayed time, the lubricant increment re-obtained may be corrected by the following formula: $k*DT$, wherein DT refers to the lubricant increment re-obtained, k is a regulation coefficient in the range of 1.05-1.35; and calculating the average of the lubricant increments re-obtained previously and the corrected re-obtained lubricant increment.

17. The method of claim 13, further comprising: determining whether the interval between two of the multiple measurements is greater than the determined interval and less than the maximum value of delayed time, and in response to that the interval between two of the multiple measurements is greater than the determined interval and less than the maximum value of delayed time, the lubricant increment re-obtained may be corrected by the following formula: $k*DT*(AT-T)/(t-T)$, wherein DT refers to the lubricant increment re-obtained, k is a regulation coefficient which is 1.35, AT is the interval between two measurements, t is the maximum value of delayed time, Ti is the determined interval; and calculating the average of the lubricant increments re-obtained previously and the corrected re-obtained lubricant increments.

18. The method of claim 13, further comprising:
determining whether the difference value between the lubricant quantity at a first timing and that at a second timing is greater than a first threshold value;
delaying a period and determining whether the difference value between the lubricant quantity at a third timing and that at a fourth timing is greater than a second threshold value in response to that the difference value between the lubricant quantity at the first timing and that at the second timing is greater than the first threshold value; and
detecting the lubricant increment in response to that the difference value between the lubricant quantity at the third timing and that at the fourth timing is greater than the second threshold value.

19. The method of claim 18, further comprises: determining whether the lubricant increment detected is greater than a third threshold value.

20. The method of claim 18, wherein the time between the first timing and the second timing is referred to as a first period during which the aircraft is not powered off; and the time between the third timing and the fourth timing is referred to as a second period which is equal to the first period in length.

21. The method of claim 20, wherein the difference value between the lubricant quantity at the first timing and that at the second timing is the difference value between the maximum value and the minimum value of the lubricant quantity during the first period; and the difference value between the lubricant quantity at the third timing and that at the fourth timing is the difference value between the maximum value and the minimum value of the lubricant quantity during the second period.

22. The method of claim 18, wherein the first timing is before the aircraft is powered-off, the second timing is after the aircraft is repowered; and the third timing is the same time as the first timing, the fourth timing is later than the second timing.

23. The method of claim 18, wherein each of the first threshold value, the second threshold value and the third threshold value is the minimum added amount of lubricant as required for aircraft maintenance.

24. The method of claim 13, further comprising: determining whether the difference value between the lubricant quantity at the first timing and that at the second timing is greater than a predetermined threshold, wherein the first timing is within 8-15 minutes after the engine is shutdown, the second timing is later than the lubricant adding period as required for aircraft maintenance.

25. The method of claim 13, further comprising: determining whether the difference value between the lubricant quantity at the third timing and that at the fourth timing is greater than a predetermined threshold, wherein the third timing is within 8-15 minutes after the engine is shutdown, the fourth timing is within 3-10 seconds before the engine is started.

26. A system for detecting addition of engine lubricant, comprising:
an adding detection module configured to determine whether difference value between the maximum value and the minimum value of the lubricant quantity during a first period is greater than a first threshold value;
a verification module configured to determine whether the difference value between the maximum value and the minimum value of the lubricant quantity during the second period is greater than a second threshold value in response to that the difference value between the maximum value and the minimum value of the lubricant quantity during the first period is greater than the first threshold value, wherein the second period is later than the first period; and
an increment calculation module configured to detect the lubricant increment in response to that the difference value between the maximum value and the minimum value of the lubricant quantity during the second period is greater than the second threshold value.

27. The system of claim 26, wherein the increment calculation module is configured to
obtain the maximum lubricant increment;
delay a period and re-obtain an lubricant increment;
determine an interval between two measurements according to the lubricant increment re-obtained;
re-obtain lubricant increments for multiple times according to the determined interval; and
calculate the average of the lubricant increments re-obtained for multiple times.

28. The system of claim 27, wherein the interval between two measurements corresponding to a greater lubricant increment re-obtained is less than that corresponding to a smaller lubricant increment re-obtained.

29. The system of claim 27, further comprising: the increment calculation module is configured to determine whether the interval between two of the multiple measurements is greater than the maximum value of delayed time, and calculate the average of the lubricant increments re-obtained previously in response to that the interval between two of the multiple measurements is greater than the maximum value of delayed time.

30. The system of claim 27, further comprises: the increment calculation module is configured to determine whether the interval between two of the multiple measurements is greater than the determined interval and less than the maximum value of delayed time, and in response to that the interval between two of the multiple measurements is greater than the determined interval and less than the maximum value of delayed time, the lubricant increment re-obtained may be corrected by the following formula: $k*DT$, wherein DT refers to the lubricant increment re-obtained, k is a regulation coefficient in the range of 1.05-1.35; and calculate the average of the lubricant increments re-obtained previously and the corrected re-obtained lubricant increment.

31. The system of claim 27, further comprises: the increment calculation module is configured to determine whether the interval between two of the multiple measurements is greater than the determined interval and less than the maximum value of delayed time, and in response to that the interval between is two of the multiple measurements is greater than the determined interval and less than the maximum value of delayed time, the lubricant increment re-obtained may be corrected by the following formula: $k*DT*(AT-T)/(t-T)$, wherein DT refers to the lubricant increment re-obtained, k is a regulation coefficient which is 1.35, AT is the interval between two measurements, t is the maximum value of delayed time, T is the determined interval; and calculate the average of the lubricant increments re-obtained previously and the corrected re-obtained lubricant increment.

32. The system of claim 26, further comprising: a power-off detection module configured to determine whether the difference value between the lubricant quantities after the aircraft is repowered and before the aircraft is powered off is greater than the first threshold value; wherein the verification module is configured to determine whether the difference value between the lubricant quantity after delaying for a period and the lubricant quantity before the aircraft is powered off is greater than the second threshold value in response to that the difference value between the lubricant quantities after the aircraft is repowered and before the aircraft is powered off is greater than the first threshold value; wherein the increment calculation module is configured to detect the lubricant increment in response to that the difference value between the lubricant quantity after delaying for a period and the lubricant quantity before the aircraft is powered off is greater than the second threshold value.

33. The system of claim 26, further comprises: a lubricant consumption calculation module configured to calculating the lubricant consumption rate of the engine according to the lubricant increment obtained from the increment calculation module and the running time of the engine.

34. The system of claim 26, further comprising: a lubricant adding event detection module configured to determine whether the difference value between the lubricant quantity at the first time and that at the second time is greater than a predetermined threshold, wherein the first time is within 8-15 minutes after the engine is shutdown, the second time is later than the lubricant adding period as required for aircraft maintenance.

35. The system of claim 26, further comprising: a lubricant adding event detection module configured to determine whether the difference value between the lubricant quantity at the first time and that at the third time is greater than a predetermined threshold, wherein the first time is within 8 15 minutes after the engine is shutdown, the third time is within 3-10 seconds before the engine is started.

36. The method of claim 2, wherein each of the first threshold value, and the second threshold value and the third threshold value is the minimum added amount of lubricant as required in aircraft maintenance.

* * * * *